United States Patent [19]

Schmidt

[11] 3,750,037

[45] July 31, 1973

[54] INDUCTORLESS LOWPASS FILTER UTILIZING FREQUENCY DEPENDENT NEGATIVE RESISTORS

[75] Inventor: Charles E. Schmidt, Woodside, Calif.

[73] Assignee: GTE Automatic Electric Laboratories Incorporated, Northlake, Ill.

[22] Filed: May 20, 1971

[21] Appl. No.: 145,140

[52] U.S. Cl. ................ 328/167, 307/295, 333/80 R
[51] Int. Cl. ........................ H03h 7/02, H03h 11/00
[58] Field of Search ...................... 333/70 R, 70 CR, 333/80 R, 80 T; 307/295; 330/107, 109; 328/167

[56] References Cited

UNITED STATES PATENTS

| | | | |
|---|---|---|---|
| 3,594,650 | 7/1971 | Henoch | 328/167 |
| 2,933,703 | 4/1960 | Kinariwala | 333/80 R |
| 3,517,342 | 6/1970 | Orchard et al. | 333/80 R X |
| 3,599,008 | 8/1971 | Gorski-Popiel | 307/295 X |

OTHER PUBLICATIONS

L. T. Bruton, "Network Transfer Functions Using The Concept of Frequency-Dependent Negative Resistance," IEEE Trans. on CT, Aug. 1969, pp. 406–408.

*Primary Examiner*—Paul L. Gensler
*Attorney*—K. Mullerheim, Leonard R. Cool, Russell A. Cannon and Theodore C. Jay, Jr.

[57] ABSTRACT

A given lowpass antisynametrical ladder filter of even degree having only a capacitor in the output branch thereof that is connected to ground and is shunted by a load resistor is transformed to an equivalent inductorless network by simulation techniques wherein each inductor, resistor and capacitor of the given filter is replaced with an associated resistor, capacitor, and frequency dependent negative resistor (FDNR), respectively. The equivalent network has a pair of output terminals, one of which is grounded, with the parallel combination of a capacitor and an FDNR connected therebetween. This combination is simulated by a Riordan circuit having one port connected to the output terminals of the equivalent network and another port terminated by the parallel combination of a resistor and a capacitor which are connected to ground.

8 Claims, 6 Drawing Figures

INVENTOR.
CHARLES E. SCHMIDT

BY Russell A. Cannon

AGENT

INVENTOR.
CHARLES E. SCHMIDT
BY Russell A. Cannon
AGENT

INDUCTORLESS LOWPASS FILTER UTILIZING FREQUENCY DEPENDENT NEGATIVE RESISTORS

BACKGROUND OF THE INVENTION

This invention relates to filters and more particularly to a lowpass filter that is realized by simulation techniques which provide a resultant inductorless lowpass filter having a resistive load impedance.

Integrated circuits are finding widespread use in electronics. A basic problem with integrated circuits, however, involves the use of inductive circuit elements. There is no satisfactory means in the available integrated circuit techniques for directly fabricating an inductive element. Although discrete inductive elements can be added to an integrated circuit, this is undesirable.

One solution in the fabrication of high quality active filters for integrated circuit applications is to design the filters using simulation techniques wherein the filter inductors are replaced with capacitively loaded gyrators. This simulation technique is satisfactory for highpass and bandpass filters which can be designed to include only inductors having one side grounded. It is unsatisfactory for lowpass filters, however, which include ungrounded or floating inductors. Although there are gyrator flotation circuits for simulating ungrounded inductors, these simulation circuits are complex in that they require twice as many active elements as are needed to simulate a grounded inductor and are difficult to bias.

An alternate technique for realizing lowpass filters and avoiding the problem of simulating ungrounded inductors is described by L. T. Bruton in the IEEE Transactions on Circuit Theory, Vol. CT-16, No. 3, August 1969, pp. 406–408, "Network Transfer Functions Using the Concept of Frequency-Dependent Negative Resistance" wherein a given passive filter network comprising inductors, resistors and capacitors is transformed to an equivalent inductorless network comprising associated resistors, capacitors, and frequency dependent negative resistors (FDNR's), respectively. An FDNR is a circuit element defined by its admittance Y which satisfies the relationships $$Y(p) = p^2 D \quad (1)$$

and $$Y = -\omega^2 D \quad (2)$$

wherein $Y(p)$ is the vector representation of the admittance $Y$, $p$ is the complex frequency parameter and is equal to $j\omega$, $j = \sqrt{-1}$, $\omega$ is the radian frequency, and D is a constant that is a positive real number. Consider, for example, the conventional lowpass ladder filter 3 that is shown in FIG. 1. Filter 3 has a signal source 4 and its associated source resistance represented by resistor 5 connected in series across the input terminals 6 and 7 thereof and a load resistor 8 connected across the filter output terminals 9 and 10. The filter 3 comprises coils 11, 12 and 13 which are floating inductors, coils 14 and 15, and the capacitors 16, 17 and 18 which each has one of the terminals thereof connected to ground. Capacitor 18 is connected in parallel with resistor 8 across the output terminals 9 and 10.

The network in FIG. 1 is transformed according to the technique described by Bruton to the equivalent network in FIG. 2 wherein corresponding elements in the two figures are represented by primed referenced characters in the latter. Each element in FIG. 2 is obtained by multiplying the vector representation of the admittance of the corresponding element in FIG. 1 by the parameter $p$ to obtain a vector representation of a resultant admittance, and replacing the corresponding element in FIG. 1 with an element having an admittance that is equal to the resultant admittance. Thus, elements in FIGS. 1 and 2 have the same numerical values of admittance except that the values thereof for the latter elements are multiplied by the parameter $p$. By way of example, when the admittance (i.e., conductance) $G_8$ of resistor 8 is multiplied by the parameter $p$, the resultant admittance is $pG_8$. This means that the admittance $G_8$ is effectively rotated counterclockwise 90° along curve 21 on the complex admittance plane in FIG. 3 into a resultant admittance (i.e., a capacitive susceptance) $pG_8$. Thus, resistor 8 is replaced by capacitor 8' in FIG. 2. In a similar manner, the admittance $1/pL_{13}$ of inductor 13 (having an inductance $L_{13}$) and the admittance $pC_{18}$ of capacitor 18 (having a capacitance $C_{18}$) are rotated 90° counterclockwise on the associated curves 22 and 23 into the resultant admittances $1/L_{13}$ and $p^2C_{18}$, respectively. Inductor 13 and capacitor 18 are therefore replaced by resistor 13' and FDNR 18' in FIG. 2. The other elements in FIG. 2 are obtained in a similar manner.

Although the equivalent network in FIG. 2 has the advantages of not requiring gyrator flotation circuits for simulating the ungrounded inductors 11–13 and being relatively insensitive to minor variations in the values of the elements thereof, it has the disadvantage of being terminated by capacitor 8'. The input resistance of the circuit following the equivalent network cannot be infinite and therefore shunts capacitor 8' with a resistor that has the effect of an inductor in shunt with resistor 8 in the original filter. The input resistance of the circuit loading the equivalent network therefore changes it from a lowpass to a bandpass network having an attenuation pole at zero frequency, i.e., the equivalent network will not pass low frequency and DC signals. Another disadvantage of the equivalent network is that the FDNR circuit requires a resistor connected to ground to supply a bias signal for the amplifiers thereof. Since the network in FIG. 2 does not include such a resistor, the inclusion of this element also causes the filter to have an attenuation pole at zero frequency so that it will not pass low frequency and DC signals.

An object of this invention is the provision of an improved inductorless equivalent lowpass filter network which is derived by simulation techniques and which overcomes the aforementioned disadvantages.

SUMMARY OF THE INVENTION

In accordance with this invention, the parallel combination of a capacitor and an FDNR terminating an equivalent network, the latter being derived from and simulating a given lowpass filter including capacitors and floating inductors or resistors, is realized by a positive immittance converter having one port connected to the output terminals of the equivalent network and another port terminated with the parallel combination of a capacitor and a resistor.

BRIEF DESCRIPTION OF THE DRAWINGS

This invention and the operation thereof will be better understood from the following detailed description taken in conjunction with the accompanying drawings in which.

Figure 1:
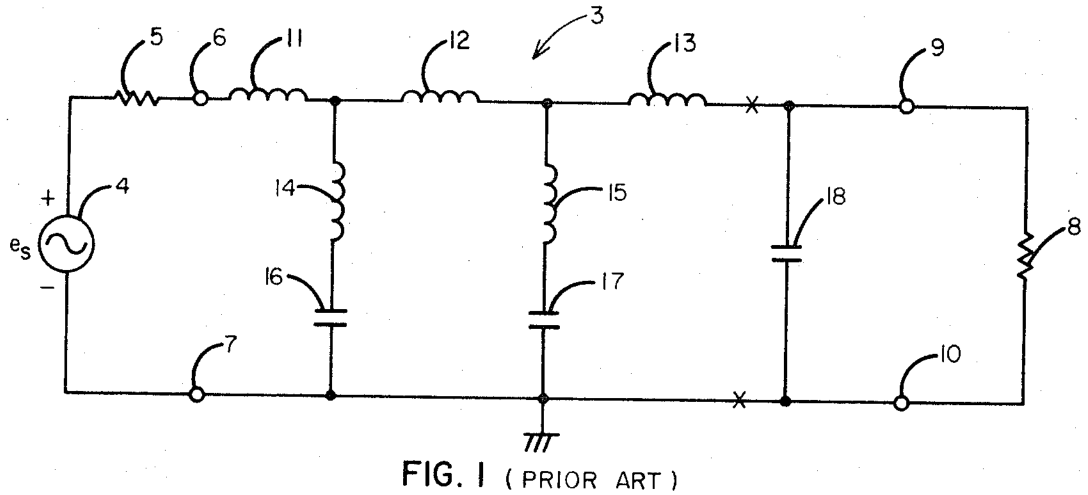
FIG. 1 (PRIOR ART)
FIG. 1 is a schematic circuit diagram of a prior art lowpass ladder filter of even degree that is terminated by a load resistor.
Figure 2:
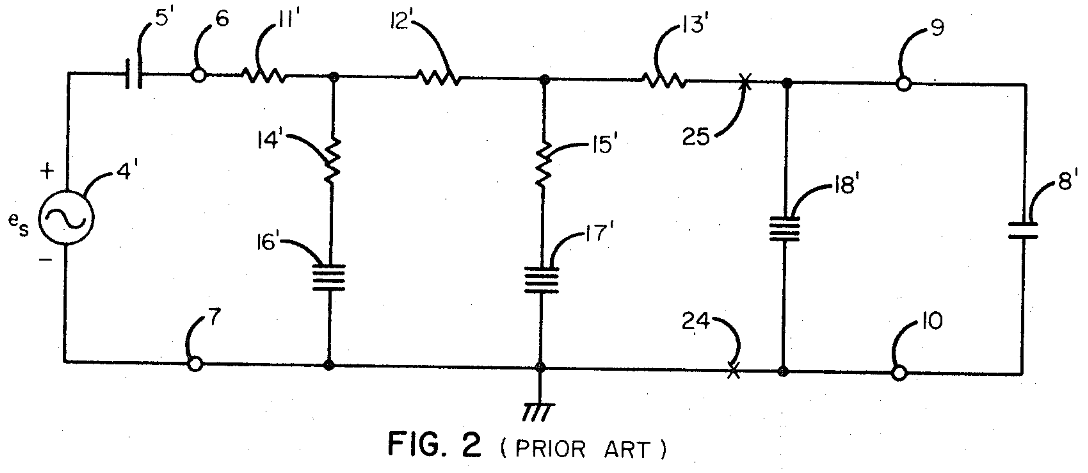
FIG. 2 (PRIOR ART)
FIG. 2 is a schematic circuit diagram of a prior art equivalent network for realizing the filter in FIG. 1.
Figure 6:
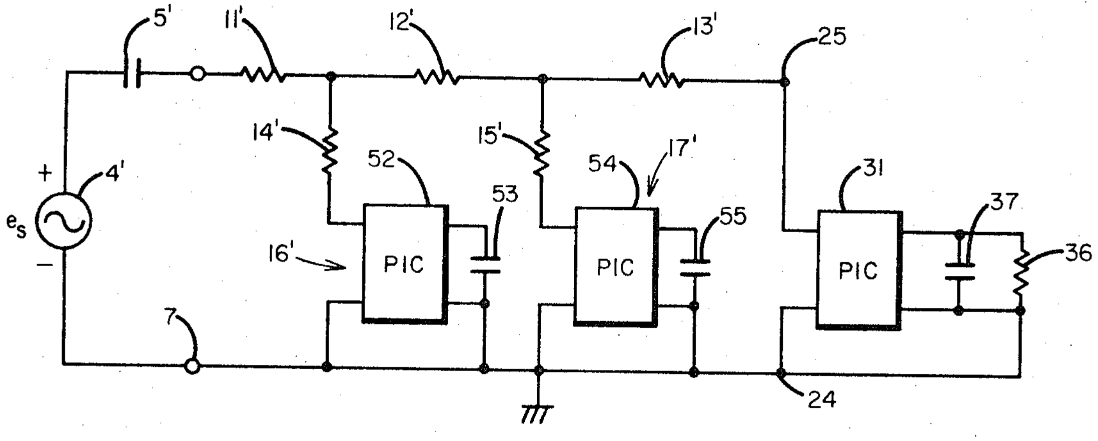
Figure 4:
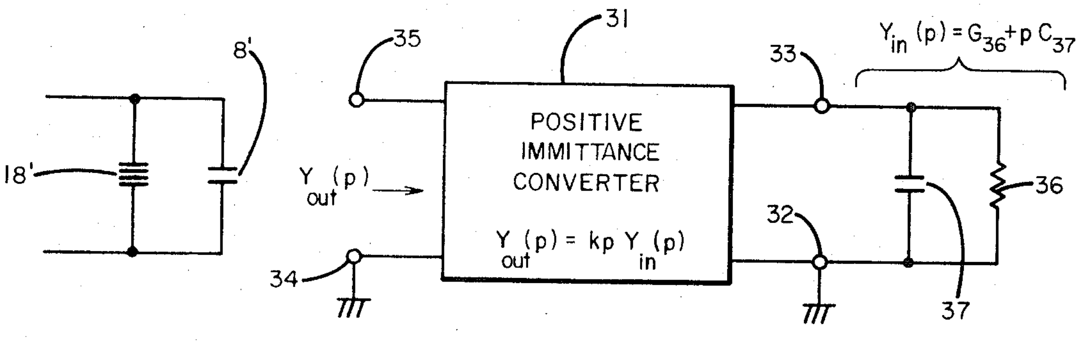
Figures 3, 5:
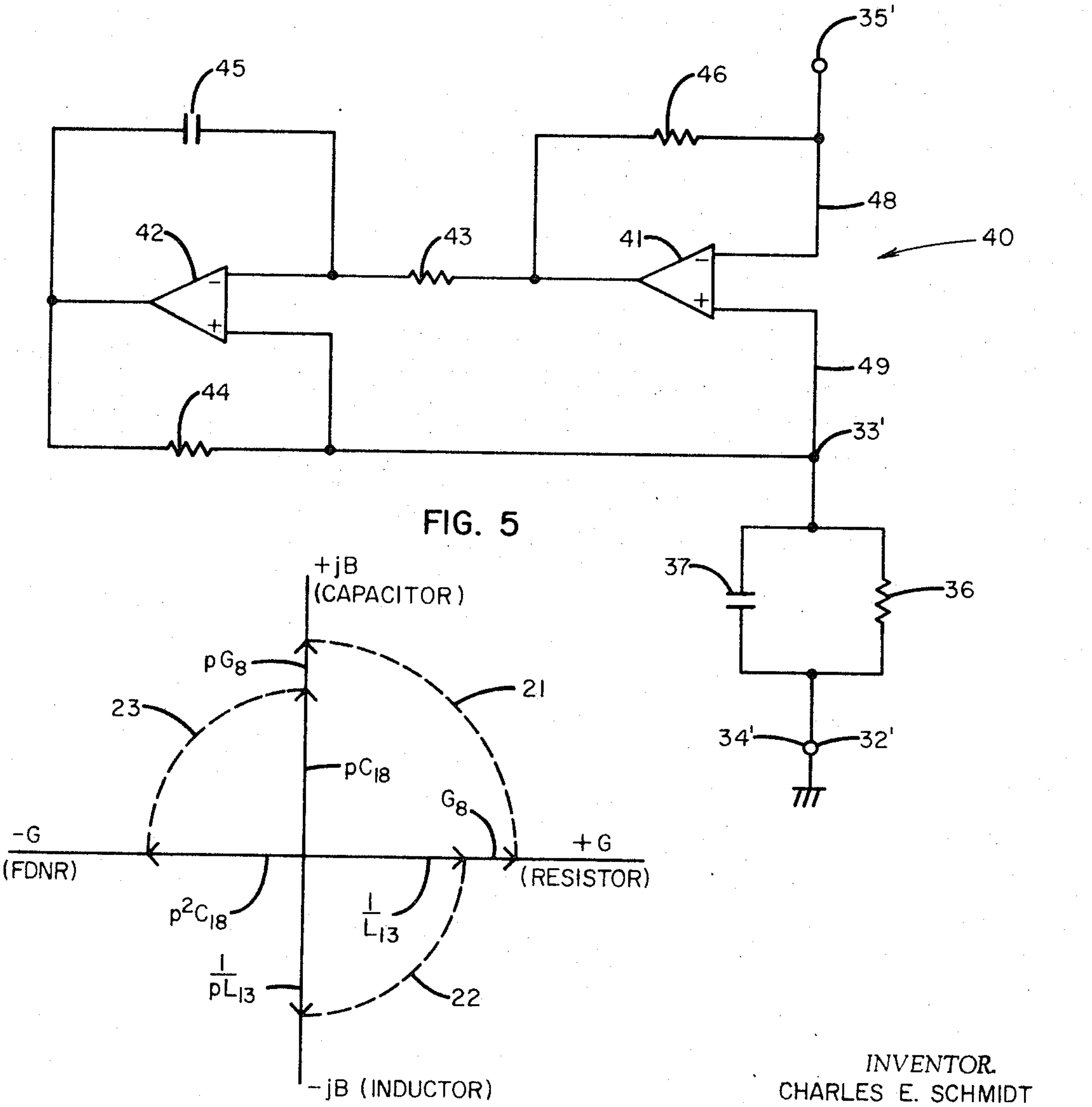
FIG. 3 is a diagrammatic representation of the complex admittance plane that is useful in explaining the derivation of the equivalent network in FIG. 2 and circuitry for practicing this invention.

reference having been made to FIGS. 1–3 in discussing the background of this invention;

FIG. 4 is a block and circuit diagram of a network useful in practicing this invention;

FIG. 5 is a schematic circuit diagram of a preferred embodiment of the network in FIG. 4; and FIG. 6 is a schematic circuit and block diagram of the network in FIG. 2 modified in accordance with this invention.

DESCRIPTION OF PREFERRED EMBODIMENT

In accordance with this invention, capacitor 8' and FDNR 18' in FIG. 2 are realized with a network that is terminated by a load resistor which simulates an element of the equivalent network, the latter element corresponding to an element of the simulated filter in FIG. 1. Stated differently, this load resistor will appear in the circuit in FIG. 1 as one of the given elements of this circuit. Termination of the equivalent network with this load resistor, which also serves as the bias resistor for active elements of the FDNR's in FIG. 2, therefore does not degrade the operation of the filter.

Referring now to FIG. 4, the network for simulating capacitor 8' and FDNR 18' comprises a positive immittance converter 31 having input terminals 32 and 33 and output terminals 34 and 35, and the parallel combination of resistor 36 and capacitor 37 connected across input terminals 32 and 33. Terminals 32 and 34 are connected to ground. The output terminals 34 and 35 are connected to the equivalent network in FIG. 2 at the points 24 and 25, respectively, in place of capacitor 8' and FDNR 18'. Converter 31 is a device which converts the admittance $Y_{in}(p)$ connected across input terminals 32 and 33 to the admittance $Y_{out}(p)$ across output terminals 34 and 35 according to the relationship $$y_{out}(p) = pkY_{in}(p) \tag{3}$$

wherein $k$ is a constant that is related to the design of the converter. The admittance $Y_{in}(p)$ presented by resistor 36 and capacitor 37 is representable as $$Y_{in}(p) = G_{36} + pC_{37} \tag{4}$$

wherein $G_{36}$ is the conductance of resistor 36 and $C_{37}$ is the capacitance of capacitor 37. The admittance $Y_{out}(p)$ across terminals 34 and 35 is therefore representable as $$Y_{out}(p) = pkG_{36} + p^2kC_{37}. \tag{5}$$

Thus, converter 31 and the load connected across the input terminals thereof appears between points 24 and 25 in FIG. 2 as the parallel combination of the capacitor 8' (having a capacitance $kG_{36}$) and the FDNR 18' (having a negative resistance $\omega^2kC_{37}$) of the equivalent network.

Referring now to FIG. 5, converter 31 may be a Riordan circuit 40 such as is described in Electronic Letters, Vol. 3, No. 8, August 1967, pp. 381–382, "RC-Active Synthesis Using Positive Immittance Convertors" by J. Gorski-Popiel. Circuit 40 comprises operational amplifiers 41 and 42 which are connected in series through resistor 43, feedback resistor 44 connected between the output of amplifier 42 and the positive inputs of both of the amplifiers, feedback capacitor 45 associated with amplifier 42, and feedback resistor 46 associated with amplifier 41. The operation of circuit 40 is described in the aforementioned Electronic Letters article.

Although circuit 40 is the same as that employed as a Riordan gyrator transformation circuit, they have different input and output ports. The input port of circuit 40 is the terminals 32' and 33', the former being connected to ground. The output port of circuit 40 is the terminals 34' 32' and 35'. The parallel combination of the load resistor 36 and capacitor 37 is connected between the grounded terminal 32' and terminal 33' which is connected to the positive input terminals of the amplifiers. The circuit in FIG. 5 is electrically connected in the equivalent network in FIG. 2 in place of capacitor 8' and FDNR 18' by joining the terminals 24 and 34' and the terminals 25 and 35'. The output of this resultant network may be taken across resistor 36, rather than between the terminals 34' and 35' in FIG. 5, since the voltage between the input terminals 48 and 49 of amplifier 41 is negligible compared to that developed across resistor 36. In accordance with this invention, resistor 36 performs the dual functions of providing a resistive path for the DC bias signal applied to active elements of the equivalent network and a resistive load impedance for the filter.

A network embodying this invention for realizing the networks in FIGS. 1 and 2 is illustrated in FIG. 6 wherein similar elements in FIGS. 2 and 6 are represented by the same reference characteristics. FDNR 16' comprises a positive immittance converter (PIC) 52 having a capacitor 53 connected across the input port thereof and having an output port connected between resistor 14' and ground. Capacitor 53 is also connected to ground. Similarly, FDNR 17' comprises a positive immittance converter (PIC) 54 having a capacitor 55 connected across the input port thereof and having an output port connected between resistor 15' and ground. The capacitor 8' and FDNR 18' are simulated in FIG. 6 by positive immittance converter (PIC) 31, resistor 36 and capacitor 37 which are connected between terminals 24 and 25 as described above. The output of the network in FIG. 6 is developed across resistor 36.

Each of the elements 5' and 11'–15' has an admittance that is numerically equal to that of the associated element in FIG. 1 multiplied by the parameter $p$. The admittances $Y_{53}(p)$ and $Y_{55}(p)$ of the associated capacitors 53 and 55 are representable as $$Y_{53}(p) = (1/pk)\ Y_{16'}\ (p) = (1/k)\ Y_{16}(p) \quad (6)$$

and $$Y_{55}(p) = (1/pk)\ Y_{17'}\ (p) = (1/k)\ Y_{17}(p) \quad (7)$$

respectively, where $Y_{16'}\ (p)$ and $Y_{17'}\ (p)$ are the admittances of the associated FDNR's 16' and 17' in FIG. 2, and $Y_{16}(p)$ and $Y_{17}(p)$ are the ) admittances of the associated capacitors 16 and 17 in FIG. 1. The admittances $Y_{36}\ (p)$ and $Y_{37}(p)$ of the associated resistor 36 and capacitor 37 are representable as $$Y_{36}(p) = (1/pk)\ Y_{8'}\ (p) = (1k)\ Y_{8}(p) \quad (8)$$

and $$Y_{37}(p) = (1/pk)\ Y_{18'}\ (p) = (1/k)\ Y_{18}(p) \quad (9)$$

wherein $Y_{8'}\ (p)$ and $Y_{18'}\ (p)$ are the admittances of the associated capacitor 8' and FDNR 18' in FIG. 2, and $Y_{8}(p)$ and $Y_{18}(p)$ are the admittances of the associated resistor 8 and capacitor 18 in FIG. 1. The proportionality constant $k$ of the Riordan positive immittance converter 40 is representable as $$k = R_{43}R_{44}C_{45}/R_{46} \quad (10)$$

wherein $R_{43}$, $R_{44}$and $R_{46}$ are the resistances of the associated resistors 43, 44 and 46, and $C_{45}$ is the capacitance of the associated capacitor 45.

Although converter 31 is described as being a Riordan circuit it will be noted that the positive immittance converter may be any gyrator circuit in which it is possible to ground one terminal of both the input and output ports thereof and which satisfies equation (3).

What is claimed is:

1. In a given lowpass filter of even degree having a first load resistor connected in parallel with a first capacitor thereof that is connected to ground; the given filter being realized by replacing in the given filter each given inductor with an associated resistor, each given resistor with an associated capacitor, and each given capacitor with an associated frequency dependent negative resistor (FDNR) to produce an equivalent inductorless network wherein corresponding associated and given elements have the same numerical values of admittance except that admittance values of the associated elements are multiplied by the complex frequency parameter $p$, the equivalent network having an FDNR connected in parallel with a second load capacitor that is connected to ground; the method of terminating the equivalent network in a second load resistor comprising the steps of replacing the parallel combination of the second capacitor and the FDNR in the equivalent network with a positive immittance converter having input and output ports and having an output admittance across the output ports that is 90° out of phase with respect to an admittance connected across the input ports thereof, connecting the parallel combination of the second resistor and a third capacitor across the input port of the converter, and connecting the output port of the converter to the equivalent network at the previous points of connection thereto of the replaced second capacitor and FDNR.

2. The method according to claim 1 wherein the operation of the converter is defined by the relationship $Y_{out}(p) = pkY_{in}(p)$ wherein $Y_{in}(p)$ is the admittance connected across the input port, $Y_{out}(p)$ is the admittance produced across the output port, $k$ is a constant determined by the design of the converter, $p = j\chi$, $j = \sqrt{-1}$, and $\omega$ is the radian frequency.

3. The method according to claim 2 including the steps of selecting the second resistor to have an admittance $Y_1(p)$ satisfying the relationship $Y_1(p) = (1/pk)\ Y_2(p)$ wherein $Y_2(p)$ is the admittance of the second capacitor, and selecting the third capacitor to have an admittance $Y_3(p)$ satisfying the relationship $Y_3(p) = (1/pk)\ Y_4\ (p)$ is the admittance of the FDNR.

4. In a given lowpass filter having a first load resistor connected thereto and to ground; the given filter being realized by replacing in the given filter each given inductor with an associated resistor, each given resistor with an associated capacitor, and each given capacitor with an associated frequency dependent negative resistor (FDNR) to produce an equivalent inductorless network wherein corresponding associated and given elements have the same numerical values of admittance except that admittance values of the associated elements are multiplied by the complex frequency parameter $p$, the equivalent network having a first load capacitor that is connected to ground; apparatus replacing and simulating the first capacitor for terminating the equivalent network in a resistive load impedance comprising a second resistor having a pair of terminals across which the output of the filter-network is taken, a positive immittance converter having a pair of input terminals connected to associated terminals of said second resistor and having a pair of output terminals, one of each of said input and output terminals being connected to ground, said converter being characterized in that the voltage between the other input and output terminals is negligible compared to that developed across said second resistor and causing the admittance across the output terminals to be 90° out of phase with an admittance connected across the input terminals thereof, and means for connecting the output terminals of said converter to the equivalent network at the original point of connection thereto of the first capacitor.

5. Apparatus according to claim 4 wherein the operation of said converter satisfies the relationship $Y_{out}(p) = pkY_{in}(p)$ wherein $Y_{out}(p)$ is the admittance produced across the output terminals thereof, $p = j\omega$, $j = \sqrt{-1}$, $\omega$ is the radian frequency, $k$ is the proportionality constant determined by said converter, and $Y_{in}(p)$ is the admittance connected across the input terminals of said converter.

6. Apparatus according to claim 5 wherein the admittance $Y_1(p)$ of said resistor satisfies the relationship $Y_1(p) = (1/pk)\ Y_2(p)$ where $Y_2(p)$ is the admittance of the first capacitor.

7. Apparatus according to claim 4 wherein the given lowpass filter is of even degree and has a second capacitor connected in parallel with the first load resistor, the equivalent network having a frequency dependent negative resistor (FDNR) connected in parallel with the first load capacitor; and including instead of the FDNR a third capacitor connected in parallel with the second resistor.

8. Apparatus according to claim 7 wherein the operation of said converter satisfies the relationship $Y_{out}(p) = pkY_{in}(p)$ wherein $Y_{out}(p)$ is the admittance produced across the output terminals thereof, $p = j\omega$, $j = \sqrt{-1}$, $\omega$ is the radian frequency, $k$ is the proportionality constant determined by said converter, and $Y_{in}(p)$ is the admittance connected across the input terminals of said converter; the admittance $Y_1(p)$ of said second resistor satisfies the relationship $Y_1(p) = (1/pk)\ Y_2(p)$ where $Y_2(p)$ is the admittance of the first capacitor; and the admittance $Y_3(p)$ of said third capacitor satisfies the relationship $Y_3(p) = (1/pk\text{pk})\ Y_4(p)$ where $Y_4(p)$ is the admittance of the FDNR.

* * * * *